(12) United States Patent
Rutter et al.

(10) Patent No.: US 10,408,672 B2
(45) Date of Patent: Sep. 10, 2019

(54) PROTECTOR FOR PHOTON DETECTOR

(71) Applicant: Government of the United States of America, as Represented by the Secretary of Commerce, Gaithersburg, MD (US)

(72) Inventors: David M. Rutter, Hagerstown, MD (US); Alan H. Band, Keedysville, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 241 days.

(21) Appl. No.: 15/689,267

(22) Filed: Aug. 29, 2017

(65) Prior Publication Data
US 2018/0094971 A1     Apr. 5, 2018

Related U.S. Application Data

(60) Provisional application No. 62/403,402, filed on Oct. 3, 2016.

(51) Int. Cl.
| G01J 1/00 | (2006.01) |
| G01J 1/02 | (2006.01) |
| G01J 1/08 | (2006.01) |
| G01J 1/44 | (2006.01) |

(52) U.S. Cl.
CPC ............. *G01J 1/0228* (2013.01); *G01J 1/08* (2013.01); *G01J 1/44* (2013.01); *G01J 2001/442* (2013.01); *G01J 2001/444* (2013.01); *G01J 2001/4466* (2013.01)

(58) Field of Classification Search
CPC ............. G01J 1/0228; G01J 1/08; G01J 1/44
USPC ..................................................... 250/214 R
See application file for complete search history.

(56) References Cited

U.S. PATENT DOCUMENTS

| 2007/0131847 A1* | 6/2007 | Yao ............................ G01J 1/44 |
| | | 250/214 R |
| 2011/0127415 A1* | 6/2011 | Kanter ..................... G01J 1/44 |
| | | 250/252.1 |

OTHER PUBLICATIONS

Jim Williams, Bias-voltage and current-sense circuts make avalanche photodiodes work, EDN, 2003, 83-102.
2 Input pulses frequency comparator, http://www.next.gr/metercounter/Checker-Circuits/2-Input-Pulses-Freguency-Comparator-15940.html, Mar. 2016.

\* cited by examiner

*Primary Examiner* — Kevin K Pyo
(74) *Attorney, Agent, or Firm* — Office of Chief Counsel for National Institute of Standards and Technology

(57) ABSTRACT

A protector to protect a photon detector includes: a pulse rate comparator and a latcher, wherein the latcher latches to a set signal from the pulse rate comparator and protects the photon detector from detecting photons when the latch signal includes a latch protect level.

33 Claims, 19 Drawing Sheets

PROTECTOR FOR PHOTON DETECTOR

CROSS REFERENCE TO RELATED APPLICATIONS

This application claims the benefit of U.S. Provisional Patent Application Ser. No. 62/403,402, filed Oct. 3, 2016, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 16-042US1.

BRIEF DESCRIPTION

Disclosed is a protector to protect a photon detector, the protector comprising: a pulse rate comparator that: receives a detector pulse train from a photon detector, the detector pulse train comprising a detector pulse rate; receives a reference pulse train from a reference, the reference pulse train comprising a reference pulse rate; compares the detector pulse rate with the reference pulse rate; and produces a set signal in response to comparison of the detector pulse rate with the reference pulse rate, the set signal comprising: a run level when the detector pulse rate is less than the reference pulse rate; and a protect level when the detector pulse rate is greater than the reference pulse rate; and a latcher in electrical communication with the pulse rate comparator and that: receives the set signal from the pulse rate comparator; and produces a latch signal comprising: a latch protect level or a latch detect level, such that: the latcher latches to the run level and produces the latch signal comprising the latch detect level until the set signal attains the protect level, whereupon the latcher produces the latch signal comprising the latch protect level; and the latch signal remains at the latch protect level until a reset signal is received from a toggle, wherein the latcher latches to the set signal in response to receiving the reset signal; and protects the photon detector from detecting photons when the latch signal comprises the latch protect level.

Also disclosed is a process for protecting a photon detector, the process comprising: receiving photons by a photon detector; producing, by the photon detector, a detector pulse train in response to receipt of the photons, the detector pulse train comprising a detector pulse rate; receiving the detector pulse train by a pulse rate comparator; receiving a reference pulse train by the pulse rate comparator, the reference pulse train comprising a reference pulse rate; comparing, by the pulse rate comparator, the detector pulse rate with the reference pulse rate; producing, by the pulse rate comparator, a set signal comprising: a run level when the detector pulse rate is less than the reference pulse rate; and a protect level when the detector pulse rate is greater than the reference pulse rate; receiving, by a latcher, the set signal from the pulse rate comparator; producing, by the latcher, a latch signal comprising: a latch protect level or a latch detect level, such that: the latcher latches to the run level and produces the latch signal comprising the latch detect level until the set signal attains the protect level, whereupon the latcher produces the latch signal comprising the latch protect level; and the latch signal remains at the latch protect level until a reset signal is received from a toggle, wherein the latcher latches to the set signal in response to receiving the reset signal; detecting, by the photon detector, photons when the latch signal comprises the latch detect level; and not detecting photons when the latch signal comprises the latch protect level to protect the photon detector.

Further disclosed is a computer-implemented method, comprising: receiving a detector pulse train comprising a detector pulse rate by a pulse rate comparator; receiving a reference pulse train by the pulse rate comparator, the reference pulse train comprising a reference pulse rate; comparing, by the pulse rate comparator, the detector pulse rate with the reference pulse rate; producing, by the pulse rate comparator, a set signal comprising: a run level when the detector pulse rate is less than the reference pulse rate; and a protect level when the detector pulse rate is greater than the reference pulse rate; receiving, by a latcher, the set signal from the pulse rate comparator; producing, by the latcher, a latch signal comprising: a latch protect level or a latch detect level, such that: the latcher latches to the run level and produces the latch signal comprising the latch detect level until the set signal attains the protect level, whereupon the latcher produces the latch signal comprising the latch protect level; and the latch signal remains at the latch protect level until a reset signal is received from a toggle, wherein the latcher latches to the set signal in response to receiving the reset signal; and communicating the latch signal to a photodetector such that the photon detector: detects photons when the latch signal comprises the latch detect level; and does not detect photons when the latch signal comprises the latch protect level.

Disclosed also is a system comprising: one or more computers configured to perform operations, the operations comprising: receiving a detector pulse train comprising a detector pulse rate by a pulse rate comparator; receiving a reference pulse train by the pulse rate comparator, the reference pulse train comprising a reference pulse rate; comparing, by the pulse rate comparator, the detector pulse rate with the reference pulse rate; producing, by the pulse rate comparator, a set signal comprising: a run level when the detector pulse rate is less than the reference pulse rate; and a protect level when the detector pulse rate is greater than the reference pulse rate; receiving, by a latcher, the set signal from the pulse rate comparator; producing, by the latcher, a latch signal comprising: a latch protect level or a latch detect level, such that: the latcher latches to the run level and produces the latch signal comprising the latch detect level until the set signal attains the protect level, whereupon the latcher produces the latch signal comprising the latch protect level; and the latch signal remains at the latch protect level until a reset signal is received from a toggle, wherein the latcher latches to the set signal in response to receiving the reset signal; and communicating the latch signal to a photodetector such that the photon detector: detects photons when the latch signal comprises the latch detect level; and does not detect photons when the latch signal comprises the latch protect level.

Also disclosed is a computer-readable medium having instructions stored thereon, which, when executed by a processor, cause the processor to perform operations comprising: receiving a detector pulse train comprising a detector pulse rate by a pulse rate comparator; receiving a reference pulse train by the pulse rate comparator, the reference pulse train comprising a reference pulse rate;

comparing, by the pulse rate comparator, the detector pulse rate with the reference pulse rate; producing, by the pulse rate comparator, a set signal comprising: a run level when the detector pulse rate is less than the reference pulse rate; and a protect level when the detector pulse rate is greater than the reference pulse rate; receiving, by a latcher, the set signal from the pulse rate comparator; producing, by the latcher, a latch signal comprising: a latch protect level or a latch detect level, such that: the latcher latches to the run level and produces the latch signal comprising the latch detect level until the set signal attains the protect level, whereupon the latcher produces the latch signal comprising the latch protect level; and the latch signal remains at the latch protect level until a reset signal is received from a toggle, wherein the latcher latches to the set signal in response to receiving the reset signal; and communicating the latch signal to a photodetector such that the photon detector: detects photons when the latch signal comprises the latch detect level; and does not detect photons when the latch signal comprises the latch protect level.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

Certain photon detectors (e.g., an avalanche photocliode (APD)) are highly sensitive single photon counters. During operation, the photodetector is subjected to a high-voltage across an optically sensitive semiconductor. When a photon strikes the semiconductor, excited charge carriers initiate an avalanche of current which results in an electrical pulse at an output terminal of the photodetector. When left unprotected, an APD can be damaged that results in decreased performance, increased dead time, complete failure, and the like due to overloading an optical input (e.g., the semiconductor) of the photon detector.

Advantageously and unexpectedly, it has been discovered that a protector provides protection of a photon detector by sensing a first rate of a detector pulse train, comparing the first rate to a second rate of a reference pulse train, and shutting down the photon detector before the photon detector can be damaged if the first rate is greater than the second rate. The protector also can include a laser interlock, lab warning system, and the like in which a photon modulator such as laser shutter isolates the photon detector from a photon source that emits an excessive number of photons. Beneficially, the protector can be used in a fluorescence lifetime measurement, medical device, safety equipment, optical communication device, and the like.

Figure 1:
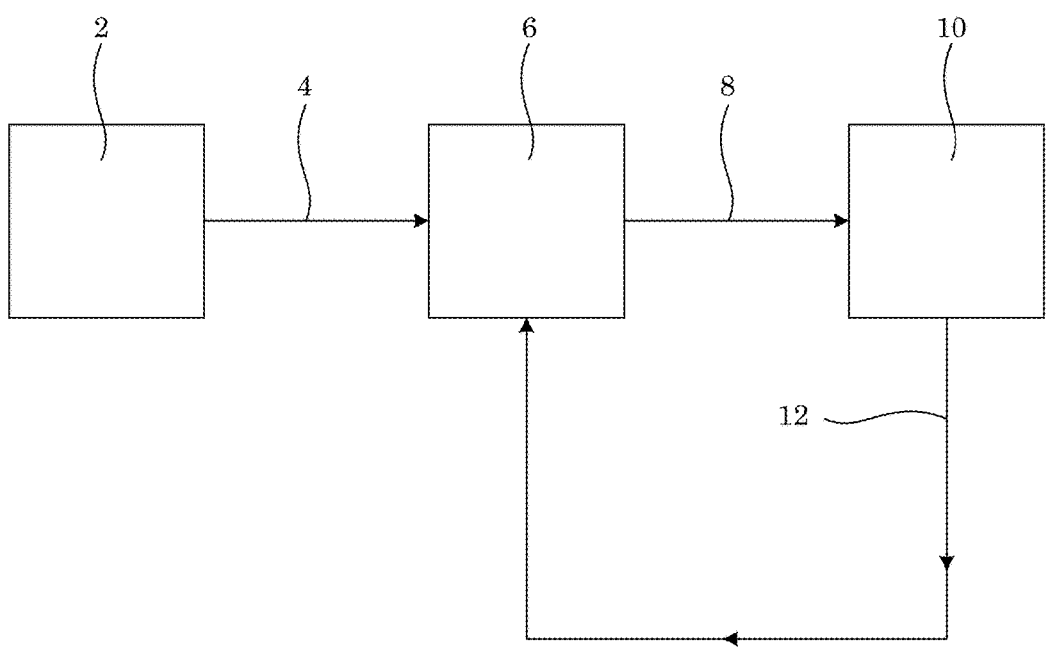
FIG. 1 shows a protector system.

In an embodiment, with reference to FIG. 1, protector system 100 includes photon source 2 that communicates photons 4 to photon detector 6; photon detector 6 in optical communication with photon source 2 and that receives photons 4 from photon source 2 and produces detector pulse train 8 in response to receipt of photons 4; and protector 10 in electrical communication with photon detector 6 and that receives detector pulse train 8 from photon detector 6. Protector 10 in response to receipt of detector pulse train 8 produces latch signal 12 that can be communicated to photon detector 6 for protection of photon detector 6. In response to receipt of latch signal 12, photon detector 6 detects photons 4 or does not detect photons 4, depending on a level of latch signal 12. Here, it is contemplated that when latch signal 12 is at a latch detect level, photon source 2 can detect photons 4. Further, when latch signal 12 is at latch protect level, photon source 2 does not detect photons 4. In this manner, protector 10 protects photon detector 6, e.g., from damage and the like that could occur due to detection of photons 4. As used herein, "protection" and its variants (e.g., "protect," "protecting," and the like) refers to prevention of detection of photons or detection an excessive number of photons by a photon detector. Accordingly, protector 10 prevents a photon detector (e.g., an avalanche photon detector (APD)) from detecting photons or detecting an excessive number of photons such that the photon detector is kept safe from harm or injury. By including an externally referenced count rate threshold, when a count rate (e.g., detector pulse rate) exceeds the reference pulse rate, the protector invokes shutdown of the photon detector or block of photons by an externally controlled device such as a shutter. That is, when the detector pulse rate of the photon detector is greater than the reference pulse rate, the photon detector is subjected to shut down.

Figure 2:
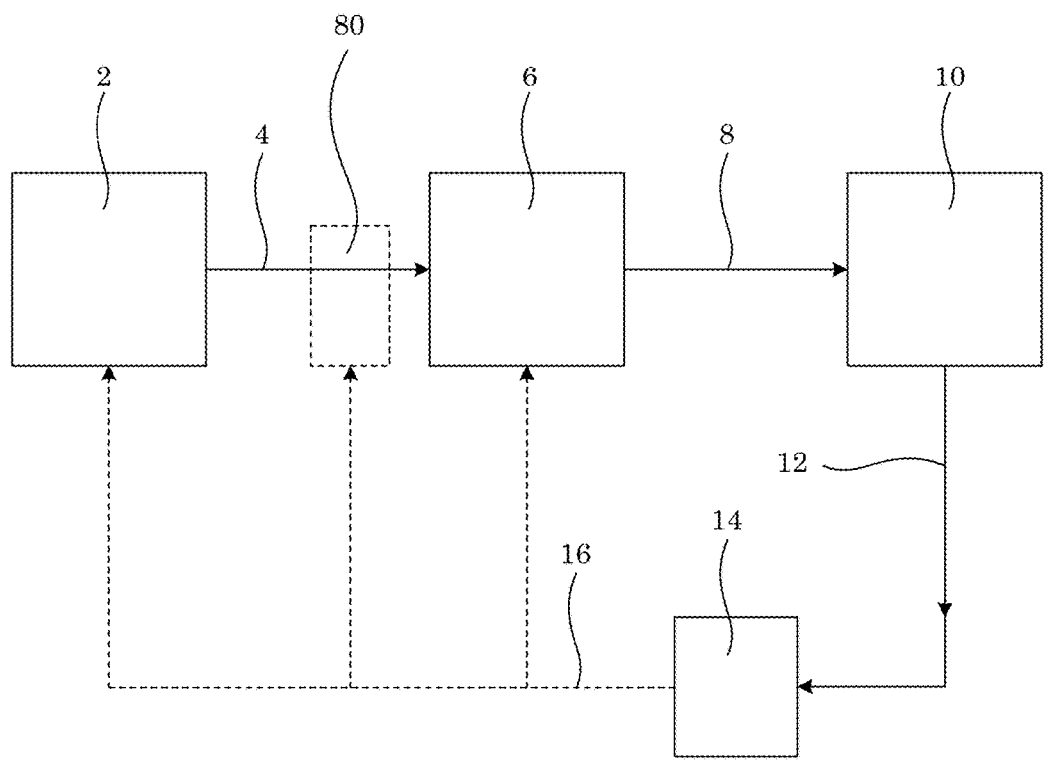
FIG. 2 shows a protector system.

Although latch signal 12 can be communicated from protector 10 to photon detector 6, in some embodiments, latch signal 12 is communicated to another component of protector system 100, e.g., photon source 2, photon modulator 80 (e.g., a shutter, beam chopper, and the like) interposed between photon source 2 and photon detector 6, and the like, e.g., as shown FIG. 2. In this manner, latch signal 12 is used to control receipt of photons 4 by photon detector 6 depending on a level of latch signal 12 received by such component.

In an embodiment, with reference to FIG. 2, protector system 100 can include controller 14 that receives latch signal 12 from protector 2 and produces control signal 16 that includes latch signal 12. Here, control signal 16 includes whatever level that latch signal 12 includes, e.g., a latch protect level or latch detect level. Control signal 16 can be directed to photon source 2, photon modulator 80, photodetector 6, and the like to control either arrival of photons 4 at photon detector 6 or detection of photons 4 by photon detector 6 in response to a level of control signal 16. Moreover, when latch signal 12 is at a latch detect level, control signal 16 is at the latch detect level, wherein: photon detector 6 can detect photons 4, or photons 4 can be communicated to photon detector 6. Further, when latch signal 12 is at latch protect level, control signal 16 is at the latch protect level, wherein: photon source 2 does not detect photons 4, or photons 4 are not communicated to photon detector 6.

Figure 3:
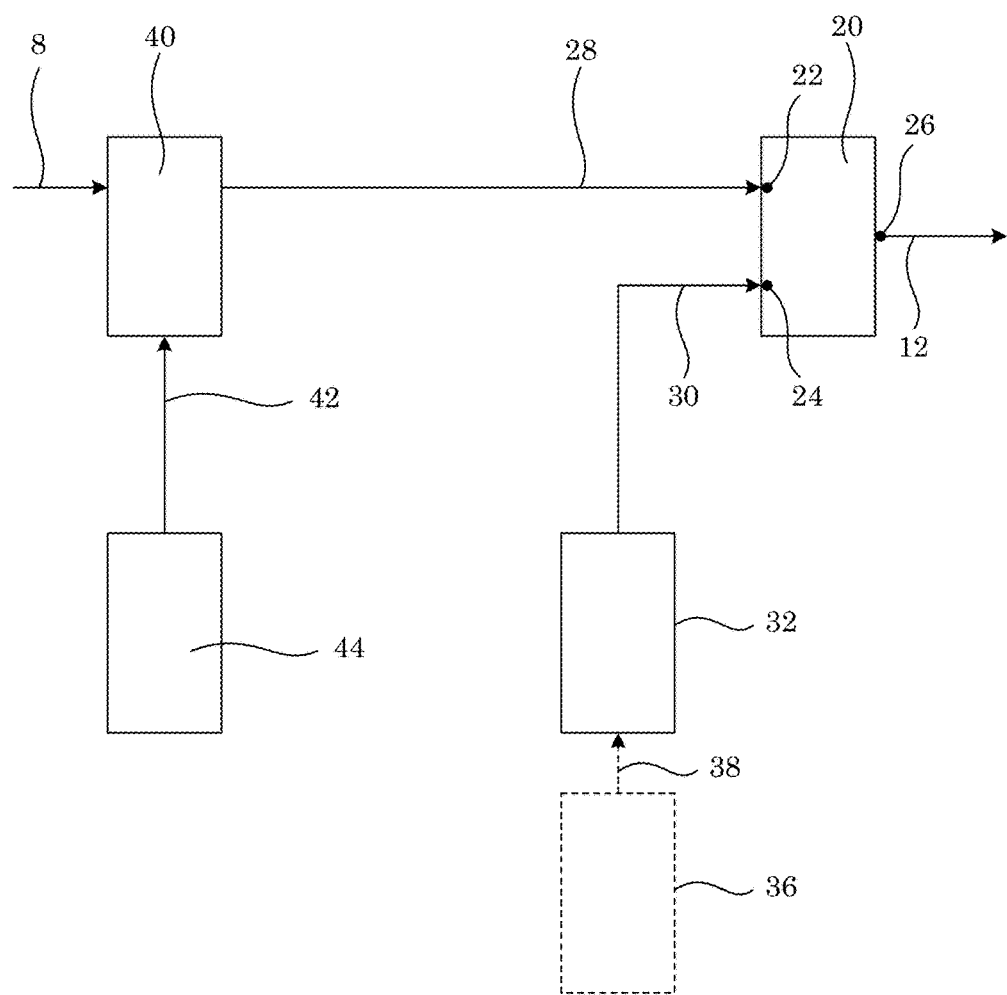
FIG. 3 shows a protector.
Figure 4:
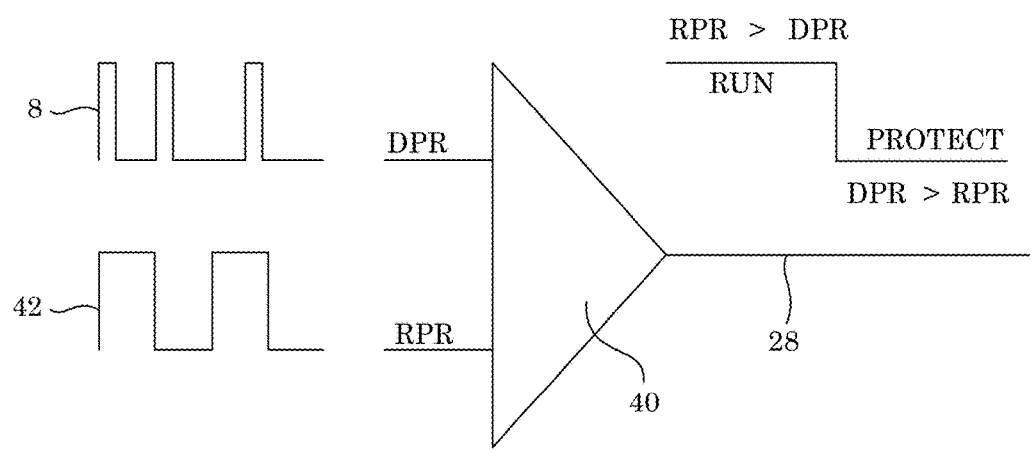
FIG. 4 shows a comparator and pulse trains.
Figure 5:
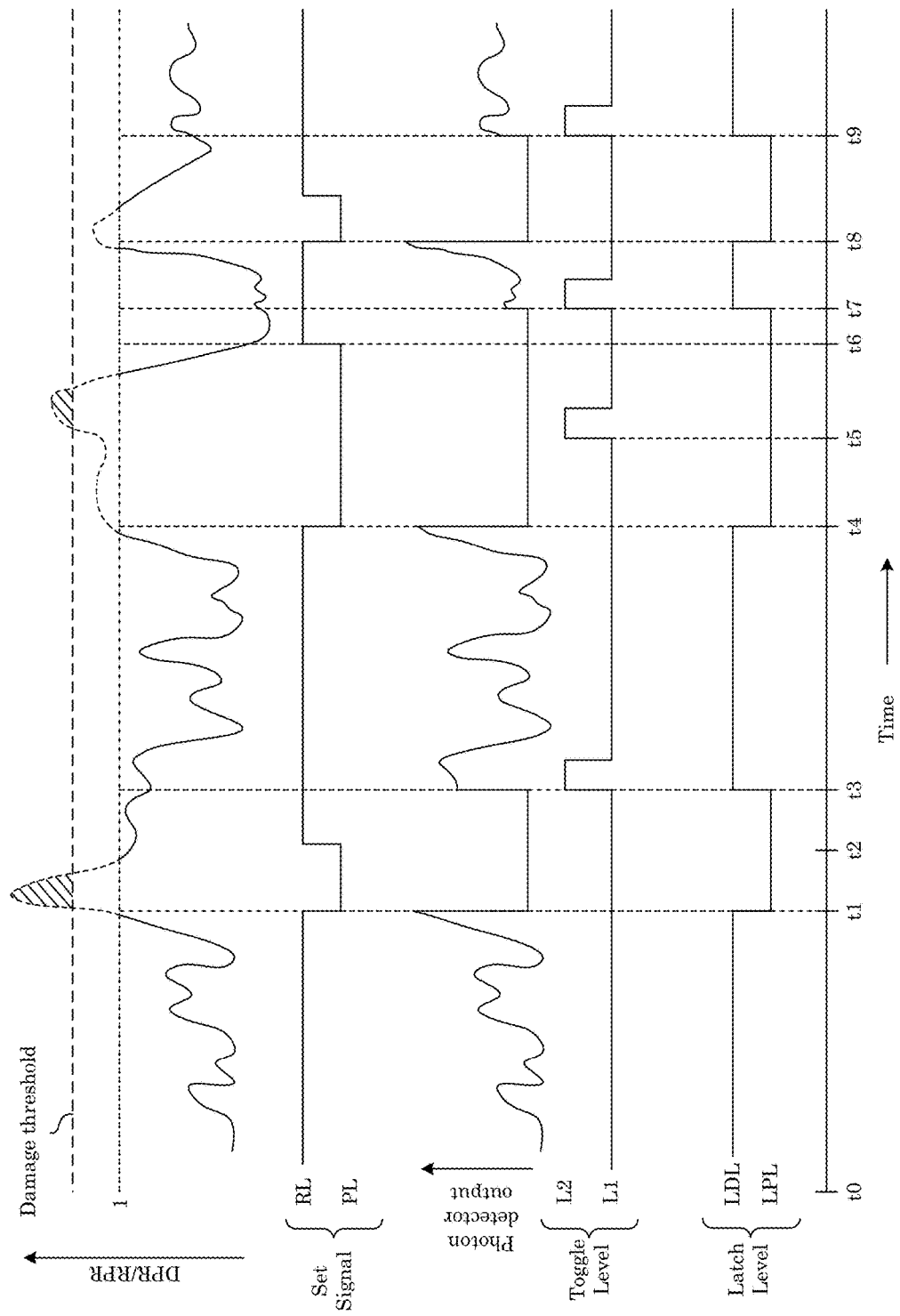
FIG. 5 shows a graph of a ratio of pulse rates, set signal, photon detector output, toggle level, and latch level versus time.

In an embodiment, with reference to FIG. 3, protector 10 includes pulse rate comparator 40 that receives detector pulse train 8 from photon detector 2. Detector pulse train includes detector pulse rate DPR. Pulse rate comparator 40 also receives reference pulse train 42 from reference 44, wherein reference pulse train 42 includes reference pulse rate RPR. As shown in FIG. 4, pulse rate comparator 40 compares detector pulse rate DPR with reference pulse rate RPR and produces set signal 28 in response to comparison of detector pulse rate DPR with reference pulse rate RPR. Set signal 28 includes: a run level when detector pulse rate DPR is less than reference pulse rate RPR; and a protect level when detector pulse rate DPR is greater than reference pulse rate RPR. When detector pulse rate DPR is equal to reference pulse rate RPR, set signal 28 can be at one of the protect level or the run level, depending on a choice by a user of protector 10, a software selection, a hardware selection, and the like. Protector 10 also includes latcher 20 in electrical communication with pulse rate comparator 40. Latcher 20 receives set signal 28 from pulse rate comparator 40 and produces latch signal 12. Latch signal 12 includes a latch protect level or a latch detect level, such that: latcher 20 latches to the run level and produces latch signal 12 including the latch detect level until set signal 28 attains the protect level, whereupon latcher 20 produces latch signal 12 including the latch protect level. Thereafter, latch signal 12 remains at the latch protect level until reset signal 30 is received from toggle 32, wherein latcher 20 latches to the level of set signal 28 in response to receiving reset signal 30. As a result, protector 10 protects photon detector 6 from detecting photons when latch signal 12 includes the latch protect level as shown in FIG. 5. In addition, protector 10 can include toggler 36 that produces toggle signal 38 and communicates toggle signal 38 to toggle 32. In response, toggle 32 produces 36 signal 30, and toggle signal 38 prompts reset signal 30 to be produced by toggle 32.

With regard to FIG. 5, a ratio of detector pulse rate DPR to reference pulse rate RPR, i.e., DPR/RPR, is less than one from time T0 to time T1; set signal 28 is at run level RL; photon detector 6 detects photons 40 and provides detector pulse train 8 (shown here as an integrated photon detector output); toggle 32 provides reset signal 30 that is at first level L1, and latch signal 12 is at latch detect level LDL. At time T1, DPR is greater than or equal to RPR; set signal 28 transitions from run level RL to protect level PL; latch signal 12 letters to protect level PL and becomes latch protect level LPL, and photon detector 6 stops detecting photons 4 in response to latch signal 12 at latch protect level LPL as shown for photon detector output becoming zero. Between time T1 and time T3, latch signal 12 is at latch protect level LPL so that photon to the their 12 does not detect photons and maintains zero photon detector output. The dashed curve for DPR/RPR between time T1 and time T3 indicates that had photon detector 12 been allowed to detect photons 4 during this time, photon detector 6 would have suffered damage due to a number of photons 4 detected by photon detector 12 exceeding a damage threshold. However, since latch signal 12 was at latch protect level LPL between time T1 and time T3 photon detector 6 did not detect photons 4, and photon detector 6 was protected due to set signal 28 attaining protect level PL at time T1 with latcher 20 latch and to protect level PL so that latch signal 12 had latch protect level LPL.

At time T3, toggle 32 communicated reset signal 30 having second level L2 to latcher 20. In response to receiving reset signal 30 from toggle 32, latcher 20 latched to set signal 28 that was at run level RL, wherein latch signal 12 transitioned from latch protect level LPL to latch detect level LDL. With latch signal 12 at latch detect level LDL, photon detector 6 was allowed to detected photons 4. Similar behavior occurred at times T4 to after T9. It should be noted that at time T5, even though reset signal 30 had second toggle level L2, latch signal 12 was at latch protect level LPL because DPR was greater than RPR.

It is contemplated that, in some embodiments, a user or external reset allows the photon detector (e.g., an APD) to come back on and resume counting photons. While a user push button is depressed or the external reset is held low at, e.g., an input of an SMA connector on the protector, shut down of the photon detector by protector is overridden no matter how long either one of those conditions exist. It is contemplated that such user or external device that resets the protector provides a short-lived, transient condition that ephemerally provides the reset while not being in a prolonged reset state. A defined pulse width can be provided by a one-shot circuit. As a result, the reset could be engaged for indefinite time without continually allowing the photon detector to re-engage. When the user or external device allows reset to return to the normal state of not being engaged, the user or external device is again allowed to reset the protector.

Figure 6:
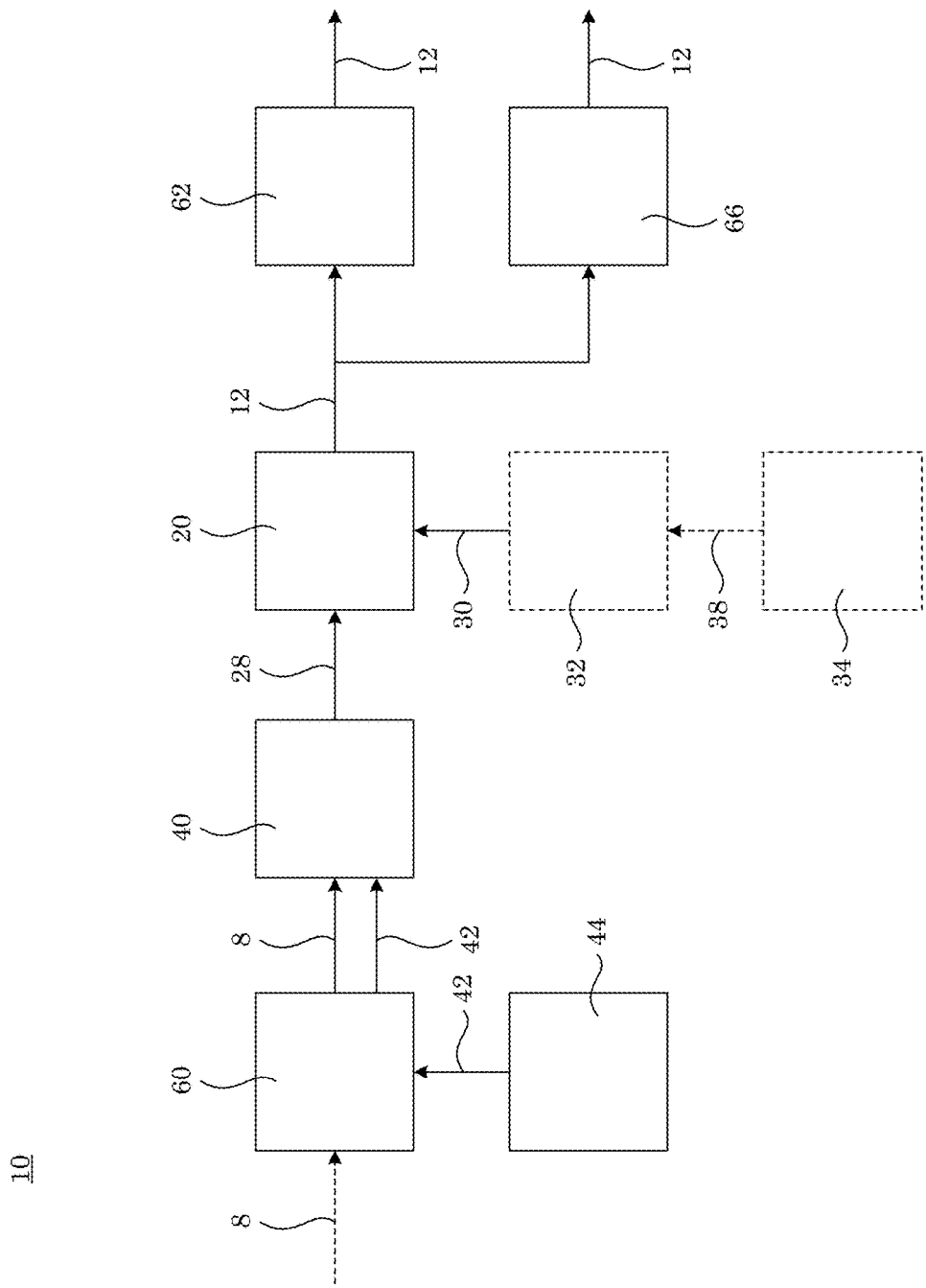
FIG. 6 shows a protector.

In an embodiment, with reference to FIG. 6, protector 10 includes buffer 60 that is electrically interposed between photon detector 6 and pulse rate comparator 40. Buffer 60 receives detector pulse train 8 from photon detector 6 and reference pulse train 42 from reference 44. Buffer 60 isolates pulses generated external to the protector. The input buffer then feeds to the frequency comparator while also communicating the same signal so that it can continue on to other parts of the experiment that rely on the photon detector output signal (i.e., photon detector pulse train) such as a correlator or other signal monitoring hardware. The output of the photon detector is then exposed to one active load with a set 50 ohm impedance instead of two active loads that could cause a signal reflection at some frequency.

Thereafter, buffer 60 communicates detector pulse train 8 and reference pulse train 42 to pulse rate comparator 40 after buffering detector pulse train 8 and reference pulse train 42.

In an embodiment, with reference to FIG. 6, protector 10 includes toggler 34 in electrical communication with toggle 32. Toggler 34 produces toggle signal 38 and communicates toggle signal 38 to toggle 32, wherein toggle 35 produces reset signal 30 in response to receipt of toggle signal 38 from toggler 34. Toggler 34 can be a mechanical, electrical, software switch, relay, and the like that provides, e.g., a logic level in toggle signal 38 that causes reset signal 30 to be communicated from toggle 32 to latcher 20 to reset latcher 20.

According to an embodiment, with reference to FIG. 6, protector 10 can include isolated output control 62 interposed between and in electrical communication with latcher 20 and photon detector 6. Isolated output control 62 receives latch signal 12 from latcher 20 and communicates latch signal 12 from protector 10, wherein latch signal 12 communicated from isolated output control 62 prevents a ground loop involving protector 10.

According to an embodiment, with reference to FIG. 6, protector 10 can include non-isolated output control 66 interposed between and in electrical communication with latcher 20 and photon detector 6. Non-isolated output control 62 receives latch signal 12 from latcher 20 and communicates latch signal 12 from protector 10, wherein non-isolated output control 66 can be referenced to an electrical ground reference or electrical ground plane in common with latcher 20.

In an embodiment, with reference to FIG. 2, protector 10 includes photon modulator 80 interposed between photon source 2 and photon detector 6. Here, photon modulator 80 is in electrical communication with latcher 10, receives latch signal 12 from latcher 10, and receives photons 4 from photon source 2. Depending on the level of latch signal 12, photon modulator 80 communicates photons 4 to photon detector 6 when latch signal 12 includes latch detect level LDL, or photon modulator 80 blocks photons 4 from being communicated to photon detector 6 when latch signal 12 includes latch protect level LPL.

In an embodiment, with reference to FIG. 2, photon detector 6 is in electrical communication with latcher 20, receives latch signal 12 from latcher 20, and receives photons 4 from photon source 2. Depending on the level of latch signal 12, photon detector 6 detects photons when latch signal 12 includes latch detect level LDL, and photon detector 6 does not detect photons 4 when latch signal 12 includes latch protect level LPL.

In an embodiment, protector 10 includes photon source 2 in optical communication with photon detector 6, wherein photon source 2 is in electrical communication with latcher 20 and receives latch signal 12 from latcher 20. Depending on the level of latch signal 12, photon source 2 produces photons 4 when latch signal 12 includes latch detect level LDL, and photon source 2 does not produce photons 4 when latch signal 12 includes latch protect level LPL.

In an embodiment, protector 10 includes controller 14 in electrical communication with latcher 20. Controller 14 receives latch signal 12 from latcher 20, produces control signal 16 that includes latch signal 12, and communicates control signal 16 to photon source 2, photon modulator 80, photon detector 6, or a combination thereof. Accordingly, photon detector 6 detects photons 4 when control signal 16 includes latch detect level LDL, and photon detector 6 does not detect photons 4 when control signal 16 includes latch protect level LPL.

In protector system 100, photon source 2 provides photons 4 to photon detector 6. Photon source 2 can be any apparatus or mechanism that produces photons who can include a room light (e.g., incandescent light, fluorescent light, and the like), laser, sunlight, chemical reaction, fluorescence, chemiluminescence, and the like.

A wavelength of photons 4 can be any wavelength that can be detected by photon detector 6., e.g. without limit, from 150 nanometers (nm) to 4500 nm.

Photon modulator 80 can be a shutter that is engaged when the detector pulse rate exceeds the reference pulse rate. Here, the photon detector can be active as the shutter blocks the photon source. The shutter can be triggered by the detector pulse rate exceeding the reference pulse rate.

Photon detector 6 can be a device that detects photons such as an avalanche photocliode (APD) and the like.

Reference 44 can be a function or square wave generator that includes a TTL square waveform into 50 ohms. It is used as the reference frequency source by which the photon detector is not allowed to operate above.

Figure 8:
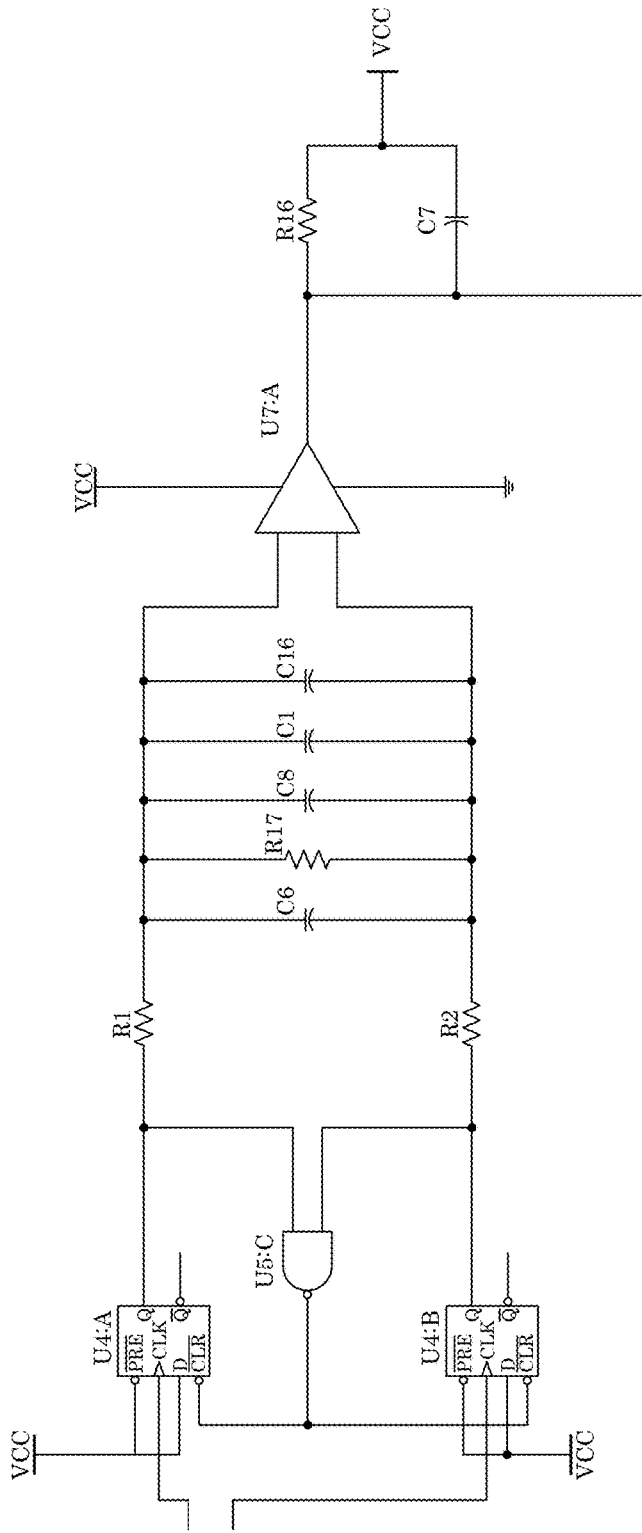
FIG. 8 shows a pulse rate comparator.

In an embodiment, with reference to FIG. 8, pulse rate comparator 40 compares pulse trains from the photon detector and the reference. Through integration of varying pulse widths, the comparator (U7) determines which pulse rate is higher.

Figure 9:
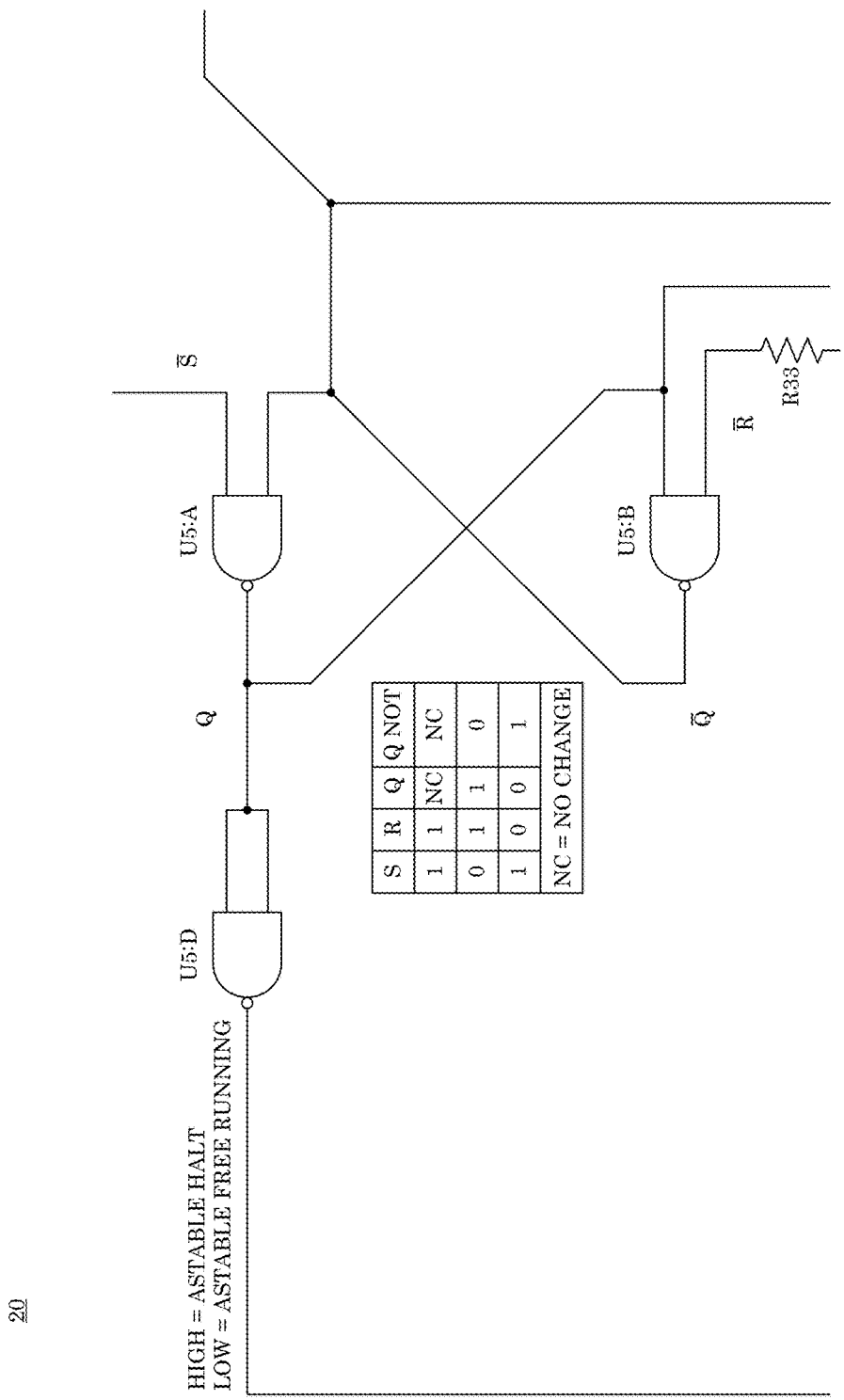
FIG. 9 shows a latcher.

Latcher 20, with reference to FIG. 9, creates a last known state which will prevent the photon detector from cycling on/off when a condition of excessive count rate in comparison to the reference pulse rate is determined. Having the latch trigger with an active low input allows the photon detector to shut down by control from the protector or by an electro-mechanical member that engages, e.g., a beam blocking shutter. The latcher can be made from dual NAND gate active low RS flip flops such that both inputs to the flip flop are normally high and can change states when either one of the inputs are taken low.

Figure 12:
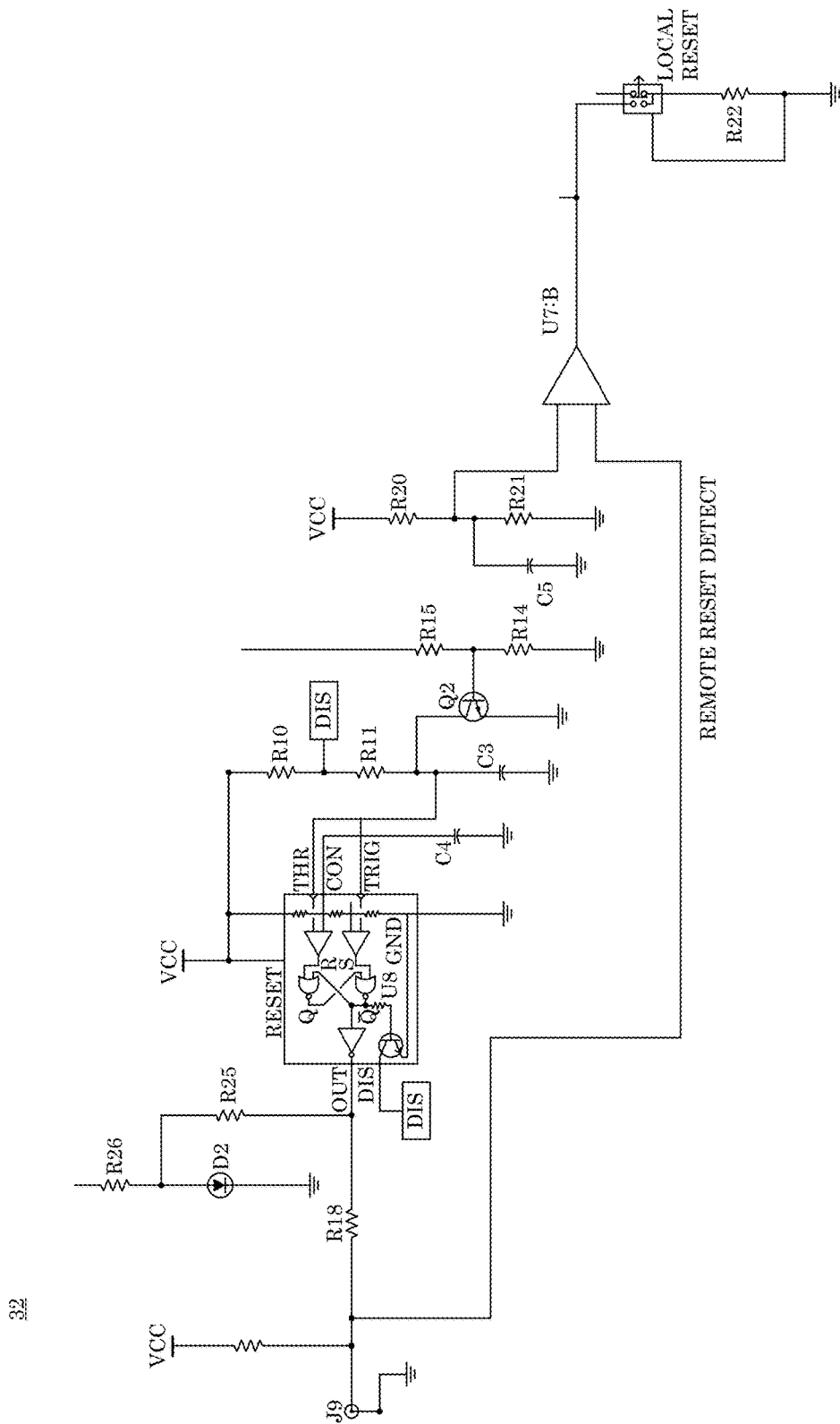
FIG. 12 shows a toggle.

Toggle 32, with reference to FIG. 12, provides a method of allowing an RS flip flop to be toggled. Toggling the RS flip flop can occur when the detector pulse rate is less than the reference pulse rate or by a manual reset (e.g., from a push button), computer, or other controlling equipment.

Figure 13:
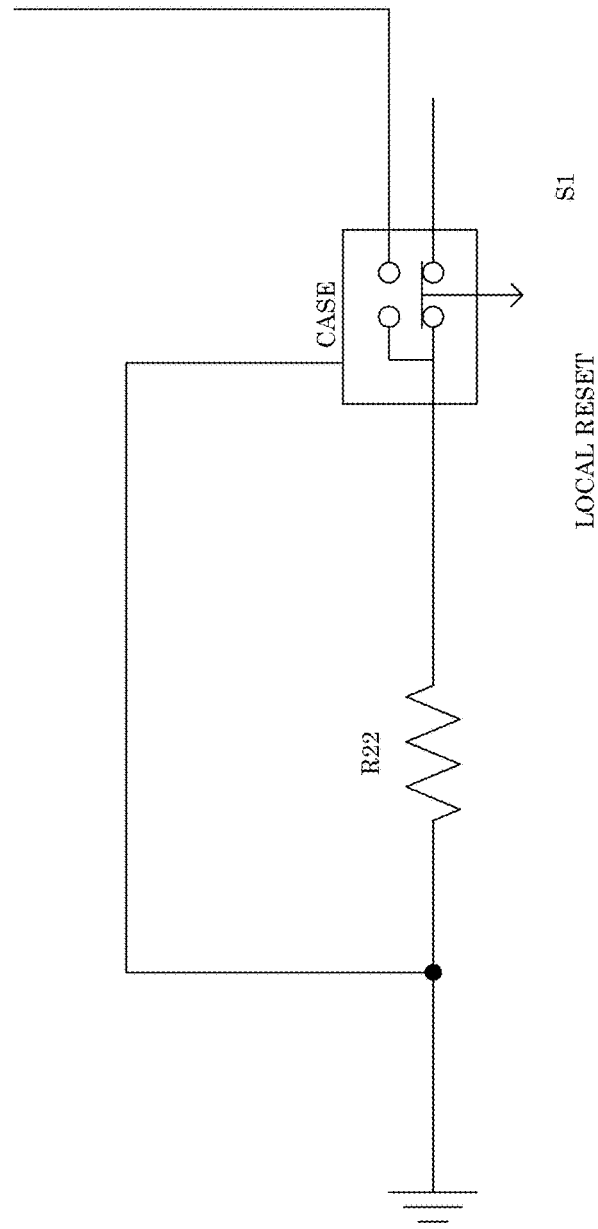
FIG. 13 shows a toggler.

Toggler 34, with reference to FIG. 13, can be a manual push button reset or provided as an electrical signal from a computer or other hardware.

Figure 7:
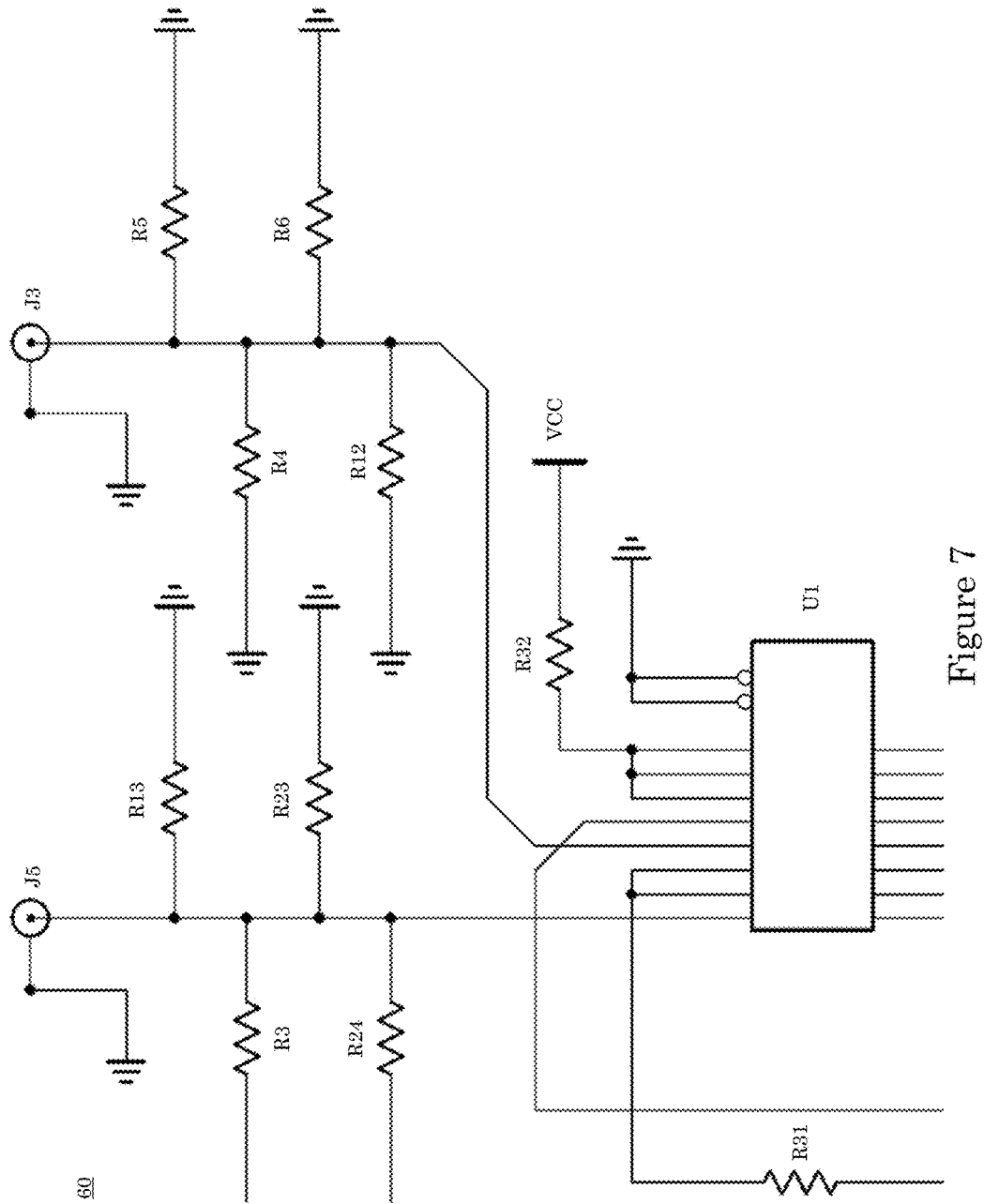
FIG. 7 shows a buffer.

Buffer 60, with reference to FIG. 7, presents a single uniform point load as visible to both the output of the photon detector and then the reference. Since the signal coming from the photo detector feeds circuits within the protector and drives elements external to the protector, buffer 60 maintains signal integrity.

Figure 10:
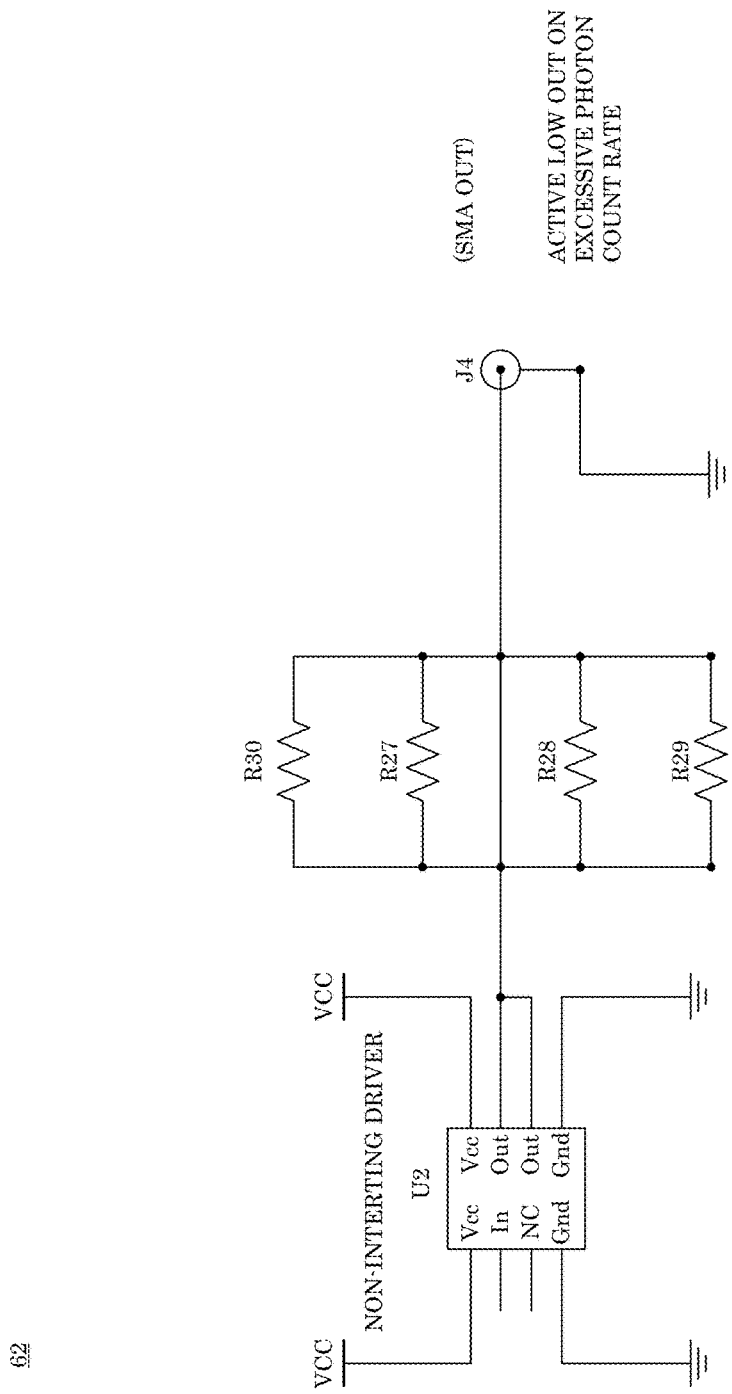
FIG. 10 shows a isolated output control.

Isolated output control 62, with reference to FIG. 10, prevents ground loops. It can be configured to trip open or trip closed upon detection of the detector pulse rate exceeding the reference pulse rate.

Figure 11:
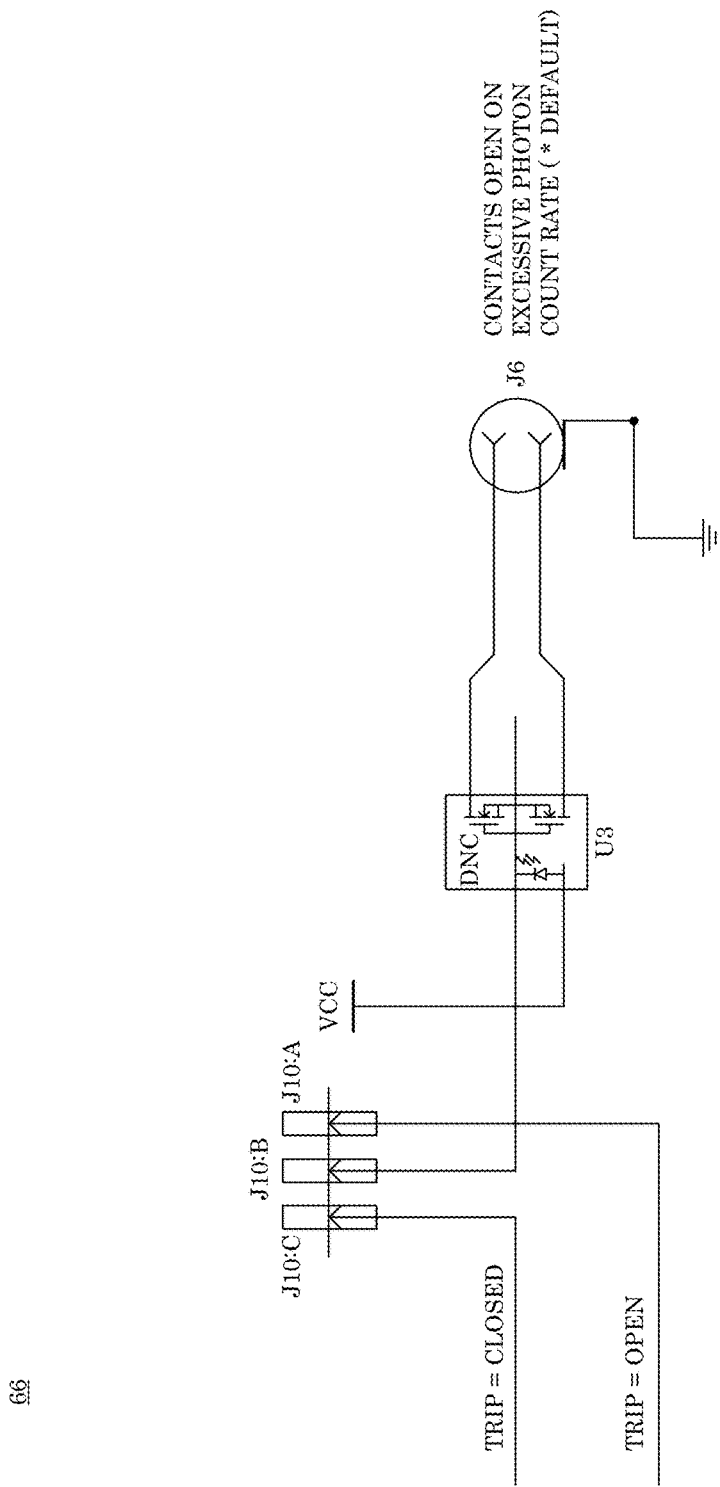
FIG. 11 shows a non-isolated output control.

Non-isolated output control 66, with reference to FIG. 11, provides and interface directly with the photon detector and can accept an active low shutdown input. Non-isolated output control 66 can be regardless of ground loops or when the photon detector is proximate to the protector.

Figure 14:
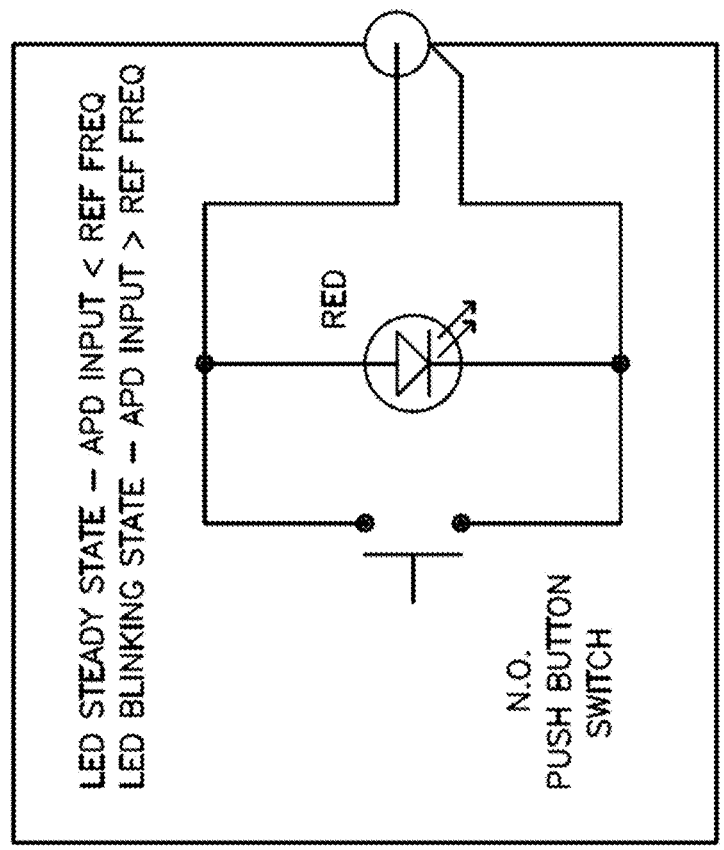
FIG. 14 shows a remote toggler.

Remote toggler 36, with reference to FIG. 14, is provided such that the protector can be used, e.g., with a laser photon source that otherwise is prohibitive to resetting the protector if the laser enclosure cannot be opened without affecting an experiment. An SMA connector on the protector provides remote reset of the protector. This SMA connector can also be connected to a computer or any other hardware that can provide contact closure translating into a reset. Such SMA connector also provides a drive for an external LED indicator that conveys to a user, computer, or other hardware a status of the protector. The LED may not be present for the remote reset to operate in a normal fashion. A steady state LED or output voltage indicates that the protector determines that the detector pulse rate is less than the reference pulse rate. A varying intensity LED (e.g., a blinking LED with current varying from 4 mA to 6 mA), or if the LED is not installed, an alternating voltage level (between, e.g., +2.5V and +5 v) can indicate that the protector has been tripped by detecting a detector pulse rate that exceeded the reference pulse rate.

Figure 15:
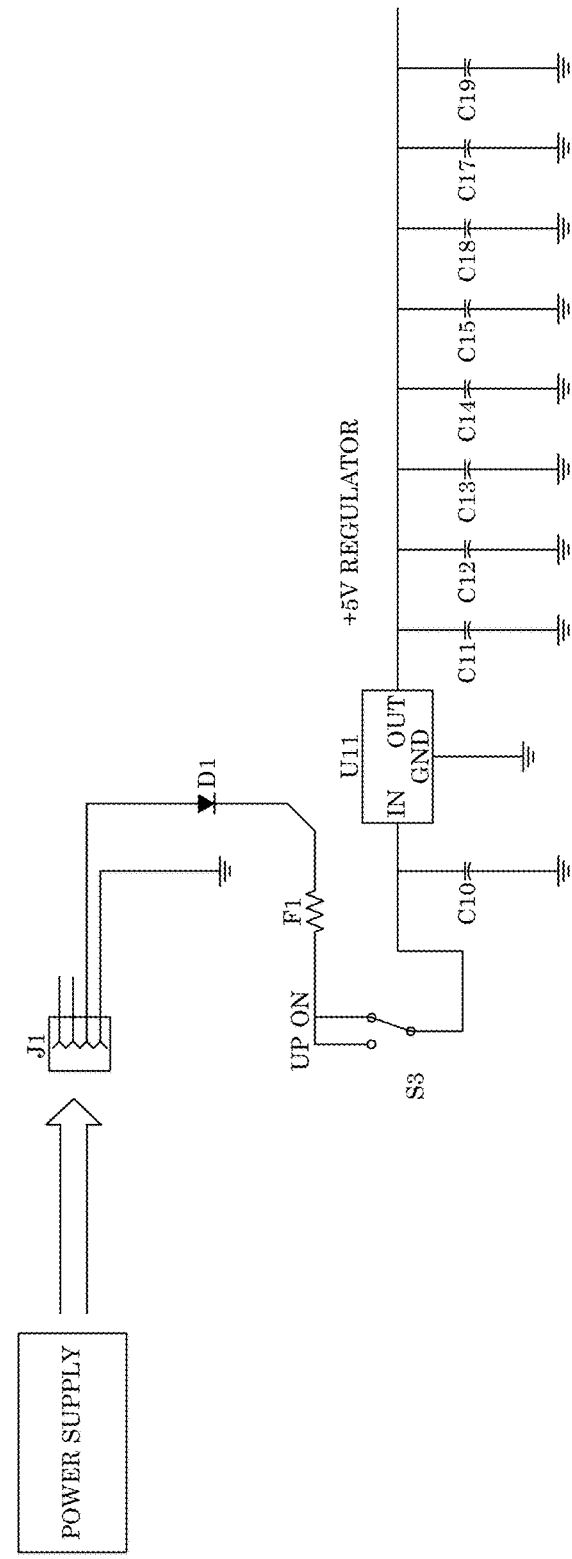
FIG. 15 shows a power source.

Power source 38, with reference to FIG. 15, can be a custom or commercial direct-current (DC) power supply to provide power to components of the protector.

Figure 16:
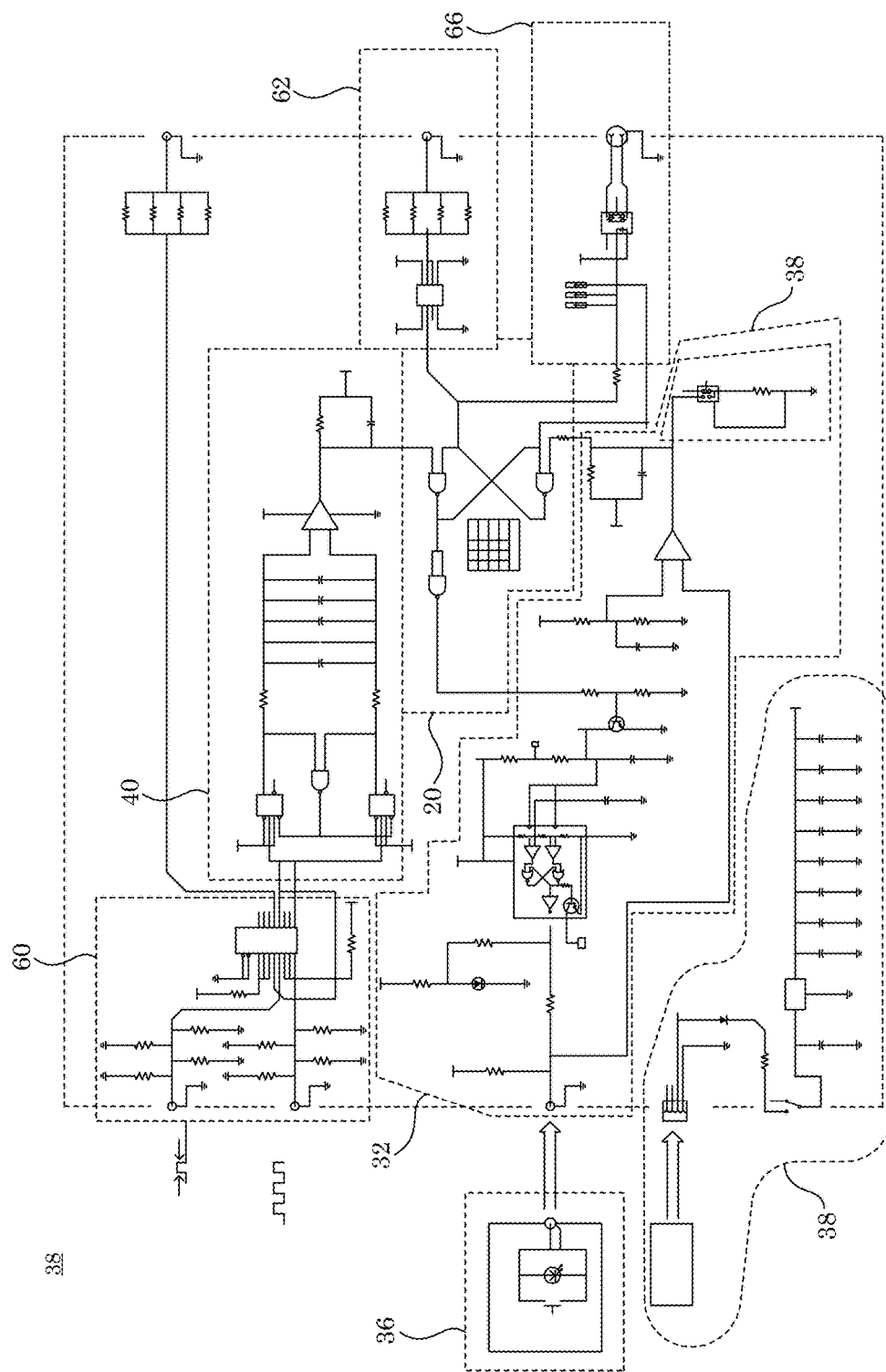
FIG. 16 shows a protector.

In an embodiment, with reference to FIG. 16, protector 10 can include buffer 60 that receives detector pulse train 8 and reference pulse train 42 in electrical communication with rate comparator 40 that is in electrical communication with laughter 20. Letter 20 is in electrical communication with isolated output control 62 and non-isolated output control 66 additionally, remote toggle or 36 can be in electrical communication with toggle 32, and toggle or 34 can be in electrical communication with toggle 32 to provide reset signal 30 to lecture 20. Further, power source 38 provides power to components of protector 10.

Here, protector 10 starts with a 74F541 buffer that interfaces with both inputs and one output TTL level signals. The reference count signal (J5) and APD photon count signal (J3) are fed to a hardware frequency comparator that consists of a 74HCT74 dual D flip-flop, and one NAND gate. The outputs of the D flip-flops are sourced by 100K ohms resistors into a set of ceramic capacitors and then fed into a comparator which determines which pulse train is faster (reference vs APD signals). The output of the comparator (open collector) then connects to a two NAND gate R-S flip-flop. Using am R-S flip-flop allows the unit to latch into a tripped state when the APD signal exceeds the reference signal. The first status related output (J4) is controlled by a MIC4452 MOSFET driver. The second status related output (J6) is controlled by a LCA715 OptoMOS relay. This isolated output can be user configured to either (trip=open contacts) or (trip=closed contacts). To reset the circuit once it has been tripped, the user has to press push button switch S1, or press (shorting) the push button switch that would connect to the two-wire remote reset (J9) connection. The comparator U7:B detects when the external reset push button switch has been engaged (shorted to ground). This has the same effect as engaging the local push switch S1. The status indicator LED (D2) illuminates steady when the circuit is not tripped and blinks when tripped. The NPN transistor Q2 turns OFF during the tripped state to allow the 555 timer to run astable and blink the internal LED along with the external LED if connected. Q2 turns ON when the circuit is in the reset state preventing the 555 timer from running astable and therefore illuminating the status indicator LED (D2) in a constant state. The two-wire remote reset box consists of a normally-open push button switch wired in parallel with a status indicator LED, center positive for the SMA coax connector.

In an embodiment, a process for making protector 10, which protects an APD from excessive photon count rates, includes designing a circuit with the selected functionality for said protection; prototyping the circuit; determining circuit packaging with appropriate connectors; laying out the circuit (e.g., in CAD software); providing the circuit, e.g., as a printed circuit board; constructing a unit that includes the circuit; and testing protector 10 for functionality.

According to an embodiment, a process for protecting a photon detector includes receiving photons by a photon detector; producing, by the photon detector, a detector pulse train in response to receipt of the photons, the detector pulse train comprising a detector pulse rate; receiving the detector pulse train by a pulse rate comparator; receiving a reference pulse train by the pulse rate comparator, the reference pulse train comprising a reference pulse rate; comparing, by the pulse rate comparator, the detector pulse rate with the reference pulse rate; producing, by the pulse rate comparator, a set signal including: a run level when the detector pulse rate is less than the reference pulse rate; and a protect level when the detector pulse rate is greater than the reference pulse rate; receiving, by a latcher, the set signal from the pulse rate comparator; producing, by the latcher, a latch signal including: a latch protect level or a latch detect level, such that: the latcher latches to the run level and produces the latch signal comprising the latch detect level until the set signal attains the protect level, whereupon the latcher produces the latch signal comprising the latch protect level; and the latch signal remains at the latch protect level until a reset signal is received from a toggle, wherein the latcher latches to the set signal in response to receiving the reset signal; detecting, by the photon detector, photons when the latch signal comprises the latch detect level; and not detecting photons when the latch signal comprises the latch protect level to protect the photon detector.

The process for protecting a photon detector further can include producing the references pulse train; and communicating the reference pulse train to the pulse rate comparator.

The process for protecting a photon detector can include producing the reset signal; and communicating the reset signal to the pulse rate comparator.

The process for protecting a photon detector can include receiving, by a buffer, the detector pulse train from the photon detector and the reference pulse train from the reference; buffering the detector pulse train and the reference pulse train by the buffer; and communicating, by the buffer, the detector pulse train and the reference pulse train to the pulse rate comparator after buffering the detector pulse train and the reference pulse train.

The process for protecting a photon detector can include producing, by a toggler, a toggle signal; communicating the toggle signal to the toggle from the toggler; and producing, by the toggle, the reset signal in response to receipt of the toggle signal from the toggler.

The process for protecting a photon detector can include receiving, by a photon modulator, the latch signal from the latcher; receiving, by the photon modulator, photons from a photon source; communicating the photons to the photon detector from the photon modulator when the latch signal comprises the latch detect level; and blocking the photons from being communicated to the photon detector from the photon modulator when the latch signal comprises the latch protect level.

The process for protecting a photon detector can include receiving, by the photon detector, the latch signal from the latcher; receiving, by the photon detector photons from a photon source; and detecting, by the photon detector, photons when the latch signal comprises the latch detect level; and not detecting, by the photon detector, photons when the latch signal comprises the latch protect level.

The process for protecting a photon detector can include receiving, by a photon source, the latch signal from the latcher; producing, by the photon source, the photons when the latch signal comprises the latch detect level; and not producing, by the photon source, the photons when the latch signal comprises the latch protect level.

The articles and processes herein are illustrated further by the following Example, which is non-limiting.

EXAMPLE

Example 1. Dual Photon Detector Protector

Figure 17:
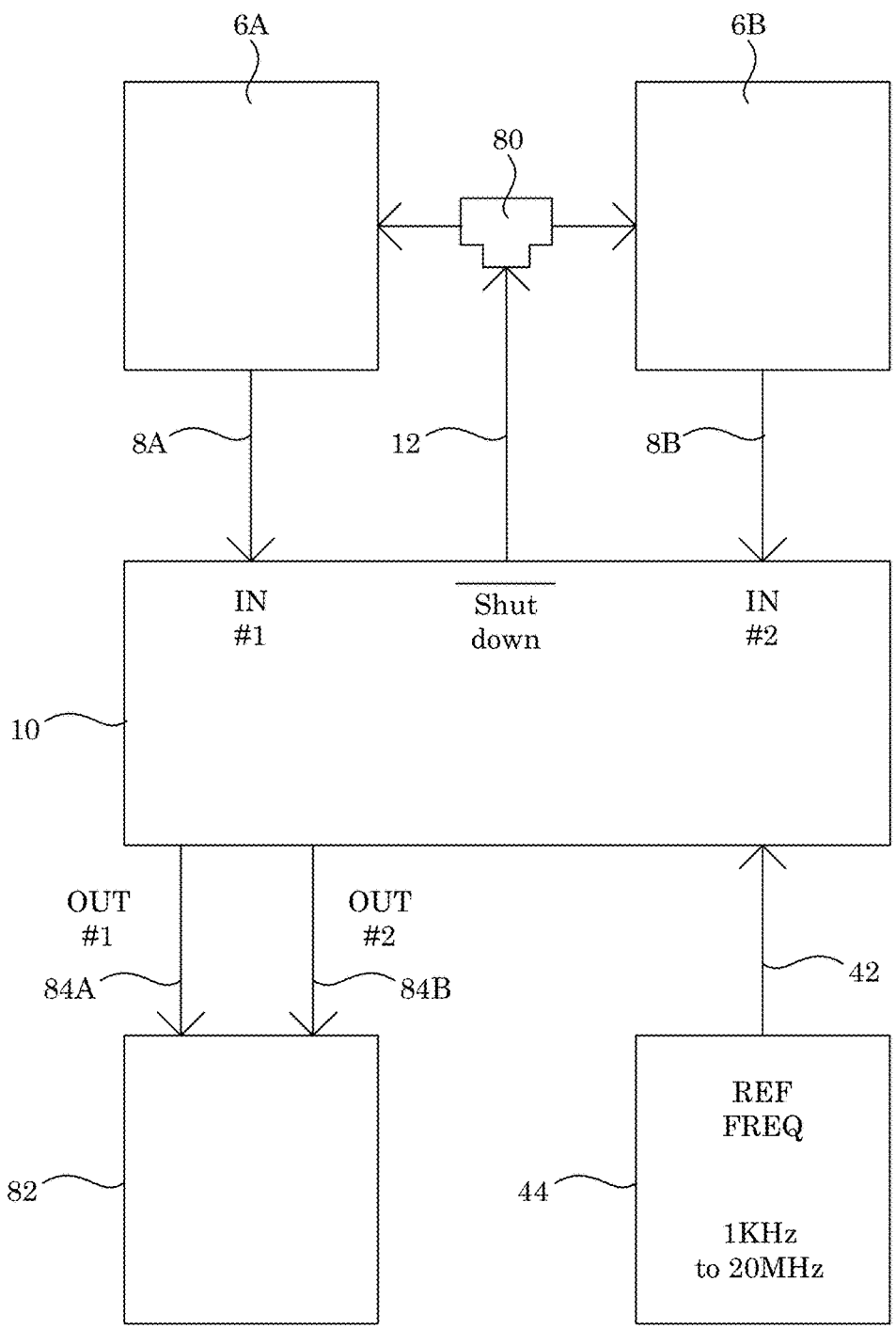
FIG. 17 shows a protector system.

Here, the embodiment in FIG. 17 was built to accommodate two APD photon counters 6A and 6B, while allowing a feedthrough path to correlator 82. The reference frequency or reference count rate 44 is compared to both photon counters count rates 8A and 8B and if either photon counters count rate exceeds the reference frequency 44, the protector will latch into the protect state (low output) that is connected to both APD photon counters via the shutdown inputs connected to the TEE connector 80.

Figure 18:
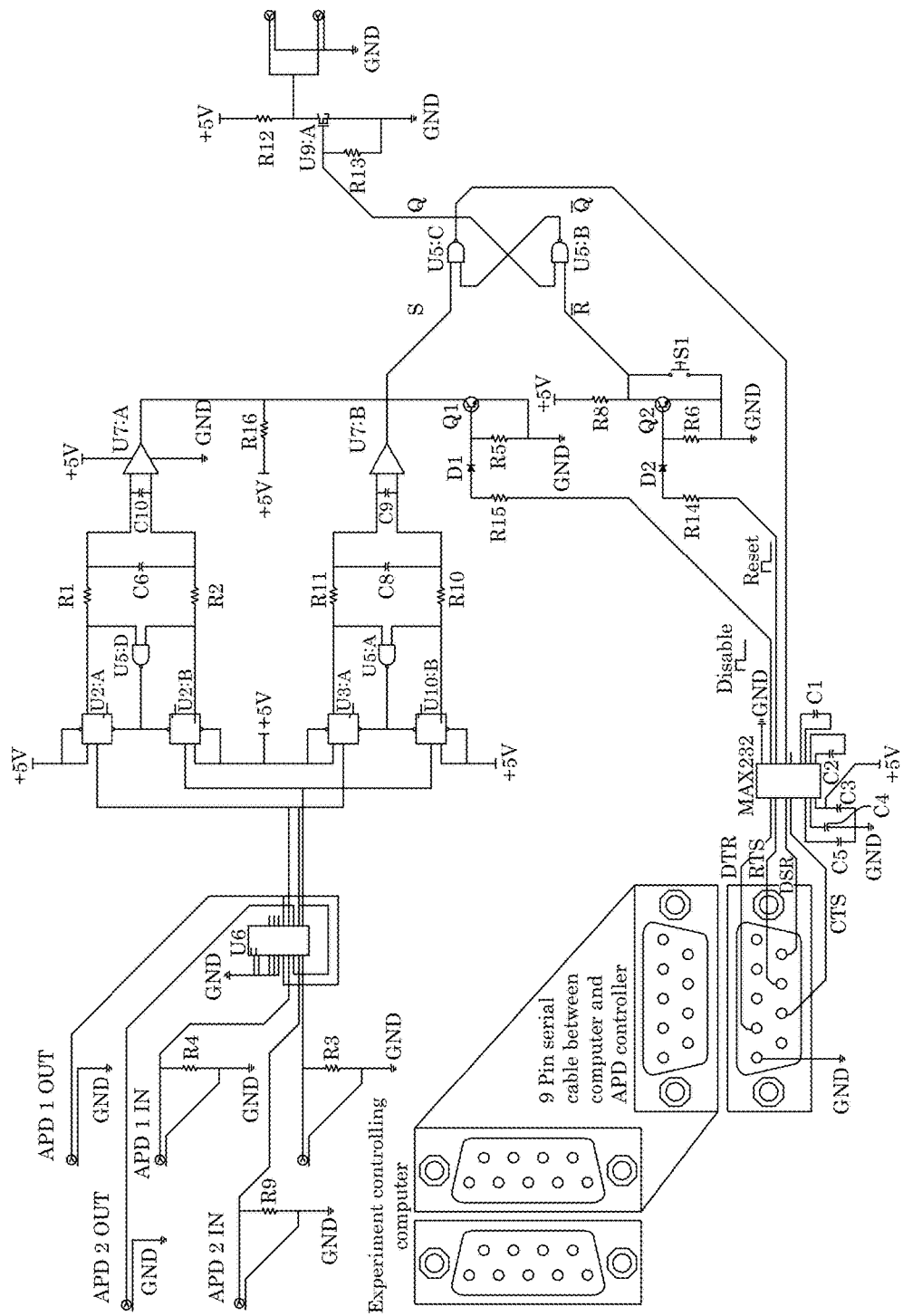
FIG. 18 shows a protector.

FIG. 18 shows a schematic for the article shown in FIG. 17. This circuit can be connected to a computer via RS232 that controls the disable and reset functions externally to the protector. Run/Protect status also can be read back to a computer via RS232. A frequency comparator is used to compare each of the photon counters count rates with outputs logically combined (i.e., OR'ed together) with open collector comparators. The RS flip flop feeds a MOSFET that in turn can pull down the APD shutdown inputs via a tee connection. Resetting of the protector can be accomplished either locally with the pull-down push button switch or externally with the RS232 connection. Setting of the protector or causing the shutdown of both photon counters is accomplished when either of the photon counter count rates exceed the reference count rate of reference frequency, or can be accomplished with RS232.

Example 2

Here, two APDs are protected by a protector at the same time for time-correlated single photon counting. Excessive count rates from either APD allows both APDs to be shut down at the same time to prevent damage to either APD.

Figure 19:
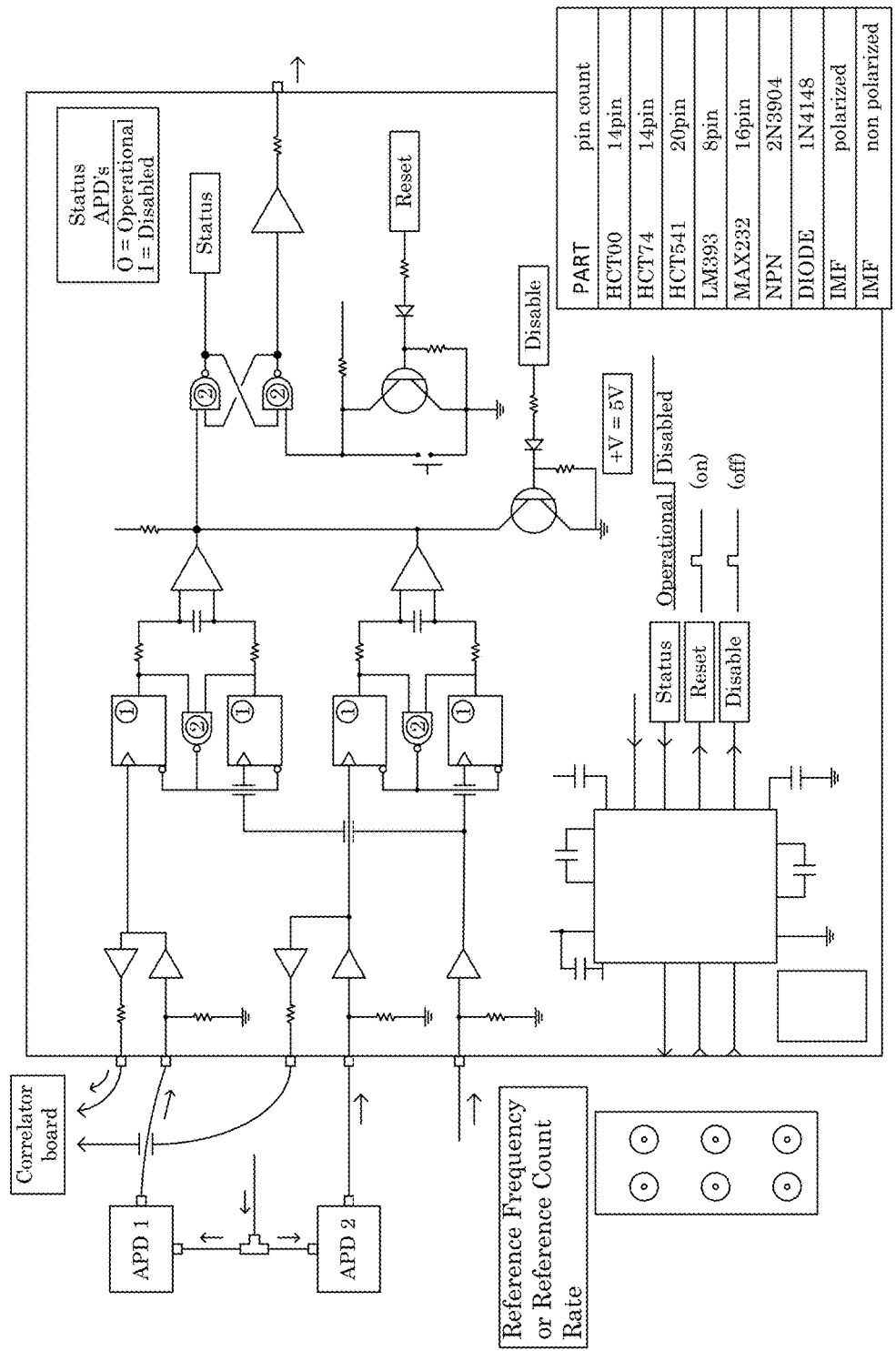
FIG. 19 shows a protector.

FIG. 19 show block functionality of signal buffers, dual frequency comparators, RS flip flop latch, and internal/external set/reset control. Components include APD #1 6A and APD #2 6B, correlator 82, reference frequency 44, protector 10, APD shutdown connections including tee connector 80.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, workstations, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, optical disks, USB drives, and so on. However, a computer need not have such devices. Moreover, a computer can be embedded in another device, e.g., a mobile telephone, a personal digital assistant (PDA), a microwave oven, mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). Such interconnects may involve electrical cabling, fiber optics, or be wireless connections.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second,"

"primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A protector to protect a photon detector, the protector comprising:
   a pulse rate comparator that:
      receives a detector pulse train from a photon detector, the detector pulse train comprising a detector pulse rate;
      receives a reference pulse train from a reference, the reference pulse train comprising a reference pulse rate;
      compares the detector pulse rate with the reference pulse rate; and
      produces a set signal in response to comparison of the detector pulse rate with the reference pulse rate, the set signal comprising:
         a run level when the detector pulse rate is less than the reference pulse rate; and
         a protect level when the detector pulse rate is greater than the reference pulse rate; and
   a latcher in electrical communication with the pulse rate comparator and that:
      receives the set signal from the pulse rate comparator; and
      produces a latch signal comprising:
         a latch protect level or a latch detect level, such that:
            the latcher latches to the run level and produces the latch signal comprising the latch detect level until the set signal attains the protect level, whereupon the latcher produces the latch signal comprising the latch protect level; and
            the latch signal remains at the latch protect level until a reset signal is received from a toggle, wherein the latcher latches to the set signal in response to receiving the reset signal; and
      protects the photon detector from detecting photons when the latch signal comprises the latch protect level.

2. The protector of claim 1, further comprising a reference that produces the references pulse train and communicates the reference pulse train to the pulse rate comparator.

3. The protector of claim 1, further comprising the toggle that produces the reset signal and communicates the reset signal to the latcher.

4. The protector of claim 1, further comprising a buffer that is electrically interposed between the photon detector and the pulse rate comparator and that:
   receives the detector pulse train from the photon detector and the reference pulse train from the reference; and
   communicates the detector pulse train and the reference pulse train to the pulse rate comparator after buffering the detector pulse train and the reference pulse train.

5. The protector of claim 1, further comprising a toggler that:
   is in electrical communication with the toggle;
   produces a toggle signal; and
   communicates the toggle signal to the toggle,
   wherein the toggle produces the reset signal in response to receipt of the toggle signal from the toggler.

6. The protector of claim 1, further comprising an isolated output control that:
   is interposed between and in electrical communication with the latcher and the photon detector;
   receives the latch signal from the latcher;
   communicates the latch signal from the protector,
   wherein the latch signal communicated from the isolated output control prevents a ground loop involving the protector.

7. The protector of claim 1, further comprising a photon modulator interposed between a photon source and the photon detector and that:
   is in electrical communication with the latcher;
   receives the latch signal from the latcher;
   receives photons from the photon source;
   communicates the photons to the photon detector when the latch signal comprises the latch detect level; and
   blocks the photons from being communicated to the photon detector when the latch signal comprises the latch protect level.

8. The protector of claim 1, wherein the photon detector:
   is in electrical communication with the latcher;
   receives the latch signal from the latcher;
   receives photons from a photon source; and
   detects photons when the latch signal comprises the latch detect level; and
   does not detect photons when the latch signal comprises the latch protect level.

9. The protector of claim 1, further comprising a photon source in optical communication with the photon detector and that:
   is in electrical communication with the latcher;
   receives the latch signal from the latcher;
   produces photons when the latch signal comprises the latch detect level; and
   does not produce photons when the latch signal comprises the latch protect level.

10. The protector of claim 1, further comprising a controller in electrical communication with the latcher and that:
    receives the latch signal from the latcher;
    produces a control signal that comprises the latch signal; and
    communicates the control signal to a photon source, a photon modulator, the photon detector, or a combination comprising at least one of the foregoing,
    wherein the photon detector:
       detects photons when the control signal comprises the latch detect level; and
       does not detect photons when the control signal comprises the latch protect level.

11. A process for protecting a photon detector, the process comprising:
    receiving photons by a photon detector;
    producing, by the photon detector, a detector pulse train in response to receipt of the photons, the detector pulse train comprising a detector pulse rate;
    receiving the detector pulse train by a pulse rate comparator;
    receiving a reference pulse train by the pulse rate comparator, the reference pulse train comprising a reference pulse rate;
    comparing, by the pulse rate comparator, the detector pulse rate with the reference pulse rate;
    producing, by the pulse rate comparator, a set signal comprising:
       a run level when the detector pulse rate is less than the reference pulse rate; and a protect level when the detector pulse rate is greater than the reference pulse rate;
receiving, by a latcher, the set signal from the pulse rate comparator;
producing, by the latcher, a latch signal comprising:
   a latch protect level or a latch detect level, such that:
      the latcher latches to the run level and produces the latch signal comprising the latch detect level until the set signal attains the protect level, whereupon the latcher produces the latch signal comprising the latch protect level; and
      the latch signal remains at the latch protect level until a reset signal is received from a toggle, wherein the latcher latches to the set signal in response to receiving the reset signal;
detecting, by the photon detector, photons when the latch signal comprises the latch detect level; and
not detecting photons when the latch signal comprises the latch protect level to protect the photon detector.

12. The process of claim 11, further comprising:
producing the references pulse train; and
communicating the reference pulse train to the pulse rate comparator.

13. The process of claim 11, further comprising:
producing the reset signal; and
communicating the reset signal to the pulse rate comparator.

14. The process of claim 11, further comprising:
receiving, by a buffer, the detector pulse train from the photon detector and the reference pulse train from the reference;
buffering the detector pulse train and the reference pulse train by the buffer; and
communicating, by the buffer, the detector pulse train and the reference pulse train to the pulse rate comparator after buffering the detector pulse train and the reference pulse train.

15. The process of claim 11, further comprising:
producing, by a toggler, a toggle signal;
communicating the toggle signal to the toggle from the toggler; and
producing, by the toggle, the reset signal in response to receipt of the toggle signal from the toggler.

16. The process of claim 11, further comprising:
receiving, by a photon modulator, the latch signal from the latcher;
receiving, by the photon modulator, photons from a photon source;
communicating the photons to the photon detector from the photon modulator when the latch signal comprises the latch detect level; and
blocking the photons from being communicated to the photon detector from the photon modulator when the latch signal comprises the latch protect level.

17. The process of claim 11, further comprising:
receiving, by the photon detector, the latch signal from the latcher;
receiving, by the photon detector photons from a photon source; and
detecting, by the photon detector, photons when the latch signal comprises the latch detect level; and
not detecting, by the photon detector, photons when the latch signal comprises the latch protect level.

18. The process of claim 11, further comprising:
receiving, by a photon source, the latch signal from the latcher;
producing, by the photon source, the photons when the latch signal comprises the latch detect level; and
not producing, by the photon source, the photons when the latch signal comprises the latch protect level.

19. A computer-implemented method, comprising:
receiving a detector pulse train comprising a detector pulse rate by a pulse rate comparator;
receiving a reference pulse train by the pulse rate comparator, the reference pulse train comprising a reference pulse rate;
comparing, by the pulse rate comparator, the detector pulse rate with the reference pulse rate;
producing, by the pulse rate comparator, a set signal comprising:
   a run level when the detector pulse rate is less than the reference pulse rate; and
   a protect level when the detector pulse rate is greater than the reference pulse rate;
receiving, by a latcher, the set signal from the pulse rate comparator;
producing, by the latcher, a latch signal comprising:
   a latch protect level or a latch detect level, such that:
      the latcher latches to the run level and produces the latch signal comprising the latch detect level until the set signal attains the protect level, whereupon the latcher produces the latch signal comprising the latch protect level; and
      the latch signal remains at the latch protect level until a reset signal is received from a toggle, wherein the latcher latches to the set signal in response to receiving the reset signal; and
communicating the latch signal to a photon detector such that the photon detector:
   detects photons when the latch signal comprises the latch detect level; and
   does not detect photons when the latch signal comprises the latch protect level.

20. The computer-implemented method of claim 19, further comprising:
producing the references pulse train; and
communicating the reference pulse train to the pulse rate comparator.

21. The computer-implemented method of claim 19, further comprising:
producing the reset signal; and
communicating the reset signal to the pulse rate comparator.

22. The computer-implemented method of claim 19, further comprising:
receiving, by a buffer, the detector pulse train from the photon detector and the reference pulse train from the reference;
buffering the detector pulse train and the reference pulse train by the buffer; and
communicating, by the buffer, the detector pulse train and the reference pulse train to the pulse rate comparator after buffering the detector pulse train and the reference pulse train.

23. The computer-implemented method of claim 19, further comprising:
producing, by a toggler, a toggle signal;
communicating the toggle signal to the toggle from the toggler; and
producing, by the toggle, the reset signal in response to receipt of the toggle signal from the toggler.

24. A system comprising:
one or more computers configured to perform operations, the operations comprising:
  receiving a detector pulse train comprising a detector pulse rate by a pulse rate comparator;
  receiving a reference pulse train by the pulse rate comparator, the reference pulse train comprising a reference pulse rate;
  comparing, by the pulse rate comparator, the detector pulse rate with the reference pulse rate;
  producing, by the pulse rate comparator, a set signal comprising:
    a run level when the detector pulse rate is less than the reference pulse rate; and
    a protect level when the detector pulse rate is greater than the reference pulse rate;
  receiving, by a latcher, the set signal from the pulse rate comparator;
  producing, by the latcher, a latch signal comprising:
    a latch protect level or a latch detect level, such that:
      the latcher latches to the run level and produces the latch signal comprising the latch detect level until the set signal attains the protect level, whereupon the latcher produces the latch signal comprising the latch protect level; and
      the latch signal remains at the latch protect level until a reset signal is received from a toggle, wherein the latcher latches to the set signal in response to receiving the reset signal; and
  communicating the latch signal to a photon detector such that the photon detector:
    detects photons when the latch signal comprises the latch detect level; and
    does not detect photons when the latch signal comprises the latch protect level.

25. The system of claim 24, further comprising:
producing the references pulse train; and
communicating the reference pulse train to the pulse rate comparator.

26. The system of claim 24, further comprising:
producing the reset signal; and
communicating the reset signal to the pulse rate comparator.

27. The system of claim 24, further comprising:
receiving, by a buffer, the detector pulse train from the photon detector and the reference pulse train from the reference;
buffering the detector pulse train and the reference pulse train by the buffer; and
communicating, by the buffer, the detector pulse train and the reference pulse train to the pulse rate comparator after buffering the detector pulse train and the reference pulse train.

28. The system of claim 24, further comprising:
producing, by a toggler, a toggle signal;
communicating the toggle signal to the toggle from the toggler; and
producing, by the toggle, the reset signal in response to receipt of the toggle signal from the toggler.

29. A computer-readable medium having instructions stored thereon, which, when executed by a processor, cause the processor to perform operations comprising:
  receiving a detector pulse train comprising a detector pulse rate by a pulse rate comparator;
  receiving a reference pulse train by the pulse rate comparator, the reference pulse train comprising a reference pulse rate;
  comparing, by the pulse rate comparator, the detector pulse rate with the reference pulse rate;
  producing, by the pulse rate comparator, a set signal comprising:
    a run level when the detector pulse rate is less than the reference pulse rate; and
    a protect level when the detector pulse rate is greater than the reference pulse rate;
  receiving, by a latcher, the set signal from the pulse rate comparator;
  producing, by the latcher, a latch signal comprising:
    a latch protect level or a latch detect level, such that:
      the latcher latches to the run level and produces the latch signal comprising the latch detect level until the set signal attains the protect level, whereupon the latcher produces the latch signal comprising the latch protect level; and
      the latch signal remains at the latch protect level until a reset signal is received from a toggle, wherein the latcher latches to the set signal in response to receiving the reset signal; and
  communicating the latch signal to a photon detector such that the photon detector:
    detects photons when the latch signal comprises the latch detect level; and
    does not detect photons when the latch signal comprises the latch protect level.

30. The computer-readable medium of claim 29, wherein the operations further comprise:
producing the references pulse train; and
communicating the reference pulse train to the pulse rate comparator.

31. The computer-readable medium of claim 29, wherein the operations further comprise:
producing the reset signal; and
communicating the reset signal to the pulse rate comparator.

32. The computer-readable medium of claim 29, wherein the operations further comprise:
receiving, by a buffer, the detector pulse train from the photon detector and the reference pulse train from the reference;
buffering the detector pulse train and the reference pulse train by the buffer; and
communicating, by the buffer, the detector pulse train and the reference pulse train to the pulse rate comparator after buffering the detector pulse train and the reference pulse train.

33. The computer-readable medium of claim 29, wherein the operations further comprise:
producing, by a toggler, a toggle signal;
communicating the toggle signal to the toggle from the toggler; and
producing, by the toggle, the reset signal in response to receipt of the toggle signal from the toggler.

* * * * *